United States Patent
Jin et al.

(10) Patent No.: US 7,428,060 B2
(45) Date of Patent: Sep. 23, 2008

(54) OPTIMIZATION OF DIFFRACTION ORDER SELECTION FOR TWO-DIMENSIONAL STRUCTURES

(75) Inventors: Wen Jin, Sunnyvale, CA (US); Srinivas Doddi, Fremont, CA (US); Shifang Li, Pleasanton, CA (US)

(73) Assignee: Timbre Technologies, Inc., Santa Clara, CA (US)

( * ) Notice: Subject to any disclaimer, the term of this patent is extended or adjusted under 35 U.S.C. 154(b) by 344 days.

(21) Appl. No.: 11/388,265

(22) Filed: Mar. 24, 2006

(65) Prior Publication Data

US 2007/0223011 A1 Sep. 27, 2007

(51) Int. Cl.
*G01N 21/55* (2006.01)
*G01B 11/30* (2006.01)
*G01B 11/24* (2006.01)

(52) U.S. Cl. .................... 356/601; 356/445; 356/600
(58) Field of Classification Search ......... 356/445–448, 356/600–613
See application file for complete search history.

(56) References Cited

U.S. PATENT DOCUMENTS

| | | | | |
|---|---|---|---|---|
| 5,671,050 A * | 9/1997 | de Groot | .................. | 356/497 |
| 6,657,736 B1 * | 12/2003 | Finarov et al. | .............. | 356/625 |
| 6,891,626 B2 | 5/2005 | Niu | | |
| 6,913,900 B2 | 7/2005 | Kaplan | | |
| 6,943,900 B2 * | 9/2005 | Niu et al. | ................... | 356/625 |
| 7,064,829 B2 * | 6/2006 | Li et al. | ................. | 356/369 |
| 7,321,426 B1 * | 1/2008 | Poslavsky et al. | ........... | 356/369 |
| 7,330,279 B2 * | 2/2008 | Vuong et al. | ................ | 356/625 |
| 2004/0017574 A1 | 1/2004 | Vuong | | |
| 2004/0078173 A1 | 4/2004 | Bischoff | | |
| 2004/0090629 A1 | 5/2004 | Drege et al. | | |
| 2004/0167754 A1 | 8/2004 | Bischoff et al. | | |
| 2005/0209816 A1 | 9/2005 | Vuong | | |

OTHER PUBLICATIONS

Li, L. et al., (Oct. 1997) "New Formulation of the Fourier modal method for crossed surface-relief gratings," *Journal of the Optical Society of America*, 14(10):2758-2767.
Niu, X., (1999) "An Integrated System of Optical Metrology for Deep Sub-Micron Lithography," UC Berkeley Doctoral Thesis, pp. 69-86.
International Search Report and Written Opinion mailed Jul. 22, 2008, for PCT Application No. PCT/US07/07292 filed Mar. 20, 2007, 9 pages.

* cited by examiner

*Primary Examiner*—L. G. Lauchman
*Assistant Examiner*—Jarreas C Underwood
(74) *Attorney, Agent, or Firm*—Morrison & Foerster LLP

(57) ABSTRACT

The number of diffraction orders to use in generating simulated diffraction signals for a two-dimensional structure in optical metrology is selected by generating a first simulated diffraction signal using a first number of diffraction orders and a hypothetical profile of the two-dimensional structure. A second simulated diffraction signal is generated using a second number of diffraction orders using the same hypothetical profile used to generate the first simulated diffraction signal, where the first and second numbers of diffraction orders are different. The first and second simulated diffraction signals are compared. Based on the comparison of the first and second simulated diffraction signals, a determination is made as to whether to select the first or second number of diffraction orders.

41 Claims, 13 Drawing Sheets

US 7,428,060 B2

OPTIMIZATION OF DIFFRACTION ORDER SELECTION FOR TWO-DIMENSIONAL STRUCTURES

BACKGROUND

1. Field

The present application generally relates to optical metrology, and, more particularly, to the selection of the number of diffraction orders to use in generating a simulated diffraction signal for use in optical metrology measurement, processing, and/or simulation for two-dimensional structures.

2. Related Art

RCWA, differential technique, and similar algorithms have been widely used for the study and design of diffraction structures. The profiles of periodic structures are approximated by a given number of sufficiently thin planar grating slabs. Specifically, RCWA involves three main steps, namely, the Fourier expansion of the field inside the grating; calculation of the eigenvalues and eigenvectors of a constant coefficient matrix that characterizes the diffracted signal; and solution of a linear system deduced from the boundary matching conditions. RCWA divides the problem into three distinct spatial regions: 1) the ambient region supporting the incident plane wave field and a summation over all reflected diffracted orders, 2) the grating structure and underlying unpatterned layers in which the wave field is treated as a superposition of modes associated with each diffracted order, and 3) the substrate containing the transmitted wave field. For a detailed description on the use of RCWA for calculating the simulated diffraction signal off a periodic structure, refer to U.S. Pat. No. 6,891,626, titled CACHING OF INTRA-LAYER CALCULATIONS FOR RAPID RIGOROUS COUPLE-WAVE ANALYSES, by Niu et al., issued on May 10, 2005, incorporated herein by reference in its entirety.

The accuracy of the RCWA solution depends, in part, on the number of terms retained in the space-harmonic expansion of the wave fields, with conservation of energy being satisfied in general. The number of terms retained is a function of the number of diffraction orders considered during the calculations. Efficient generation of a simulated diffraction signal for a given hypothetical profile involves selection of the optimal set of diffraction orders at each wavelength for both transverse-magnetic (TM) and/or transverse-electric (TE) components of the diffraction signal. Mathematically, the more diffraction orders are selected, the more accurate the simulations. However, the higher the number of diffraction orders, the more computation is required for calculating the simulated diffraction signal. Moreover, the computation time is a nonlinear function of the number of orders used. Thus, it is useful to minimize the number of diffraction orders simulated at each wavelength. However, one cannot arbitrarily minimize the number of diffraction orders as this might result in loss of information. The importance of selecting the appropriate number of diffraction orders increases significantly when two-dimensional structures are considered in comparison to one-dimensional structures. Since the selection of the number of diffraction orders is application specific, efficient approaches for selecting the number of diffraction orders is desirable.

SUMMARY

In one exemplary embodiment, the number of diffraction orders to use in generating simulated diffraction signals for a two-dimensional structure in optical metrology is selected by generating a first simulated diffraction signal using a first number of diffraction orders and a hypothetical profile of the two-dimensional structure. A second simulated diffraction signal is generated using a second number of diffraction orders using the same hypothetical profile used to generate the first simulated diffraction signal, where the first and second numbers of diffraction orders are different. The first and second simulated diffraction signals are compared. Based on the comparison of the first and second simulated diffraction signals, a determination is made as to whether to select the first or second number of diffraction orders.

DETAILED DESCRIPTION

In order to facilitate the description of the present invention, an ellipsometric optical metrology system is used to illustrate the concepts and principles. It is understood that the same concepts and principles equally apply to the other optical metrology systems such as reflectometric systems and the like. In a similar manner, a semiconductor wafer may be utilized to illustrate an application of the concept. Again, the methods and processes equally apply to other work pieces that have repeating structures.

Figure 1A:
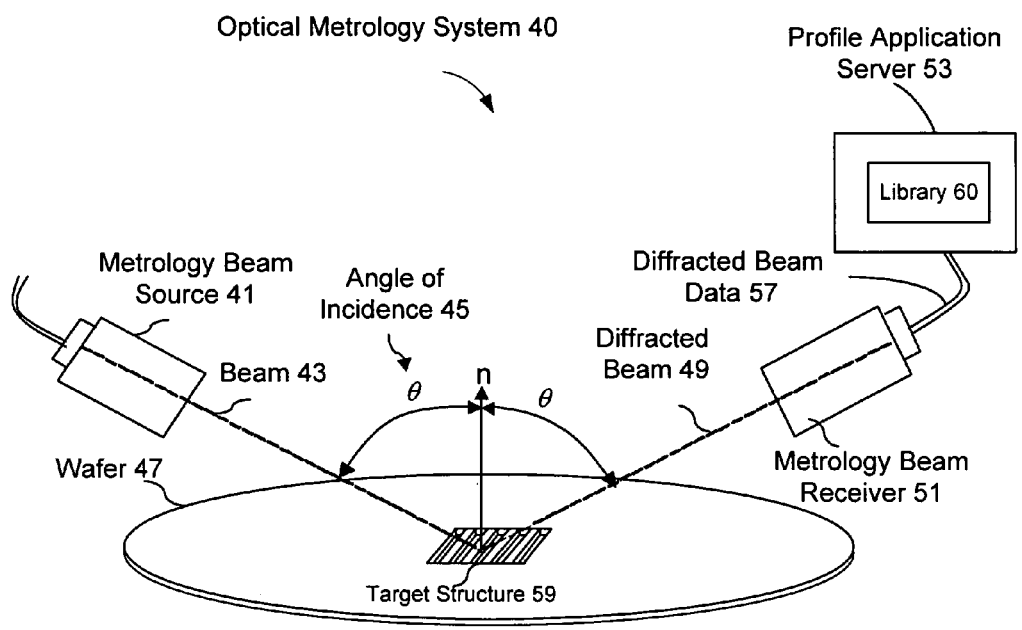
FIG. 1A is an architectural diagram illustrating an exemplary embodiment where optical metrology can be utilized to determine the profiles of structures on a semiconductor wafer.

FIG. 1A is an architectural diagram illustrating an exemplary embodiment where optical metrology can be utilized to determine the profiles of structures on a semiconductor wafer. The optical metrology system 40 includes a metrology beam source 41 projecting a beam 43 at the target structure 59 of a wafer 47. The metrology beam 43 is projected at an incidence angle θ towards the target structure 59. The diffraction beam 49 is measured by a metrology beam receiver 51. The diffraction beam data 57 is transmitted to a profile application server 53. The profile application server 53 compares the measured diffraction beam data 57 against a library 60 of simulated diffraction beam data representing varying combinations of critical dimensions of the target structure and resolution.

In one exemplary embodiment, the library 60 instance best matching the measured diffraction beam data 57 is selected. It is understood that although a library of diffraction spectra or signals and associated hypothetical profiles is frequently used to illustrate concepts and principles, the present invention equally applies to a data space comprising simulated diffraction signals and associated set of profile parameters, such as in regression, neural net, and similar methods used for profile extraction. The hypothetical profile and associated critical dimensions of the selected library 60 instance is assumed to correspond to the actual cross-sectional profile and critical dimensions of the features of the target structure 59. The optical metrology system 40 may utilize a reflectometer, an ellipsometer, or other optical metrology device to measure the diffraction beam or signal. An optical metrology system is described in U.S. Pat. No. 6,913,900, titled GENERATION OF A LIBRARY OF PERIODIC GRATING DIFFRACTION SIGNAL, by Niu, et al., issued on Sep. 13, 2005, and is incorporated herein by reference in its entirety. Other exemplary embodiments in optical metrology not requiring the use of libraries are discussed below.

Figure 1B:
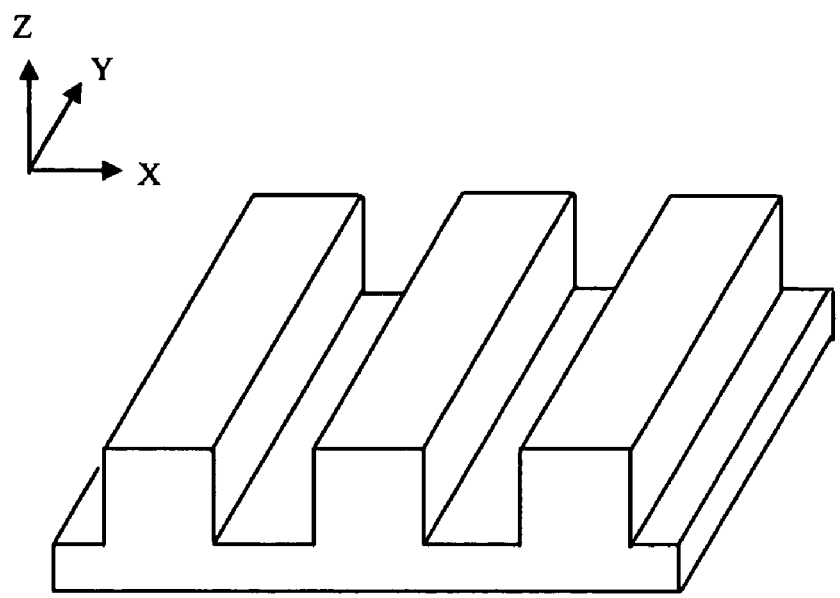
FIG. 1B depicts an exemplary one-dimensional structure.

The term "one-dimensional structure" is used herein to refer to a structure having a profile that varies in one dimension. For example, FIG. 1B depicts a periodic grating having a profile that varies in one dimension (i.e., the x-direction). The profile of the periodic grating depicted in FIG. 1B varies in the z-direction as a function of the x-direction. However, the profile of the periodic grating depicted in FIG. 1B is assumed to be substantially uniform or continuous in the y-direction.

Figure 1C:
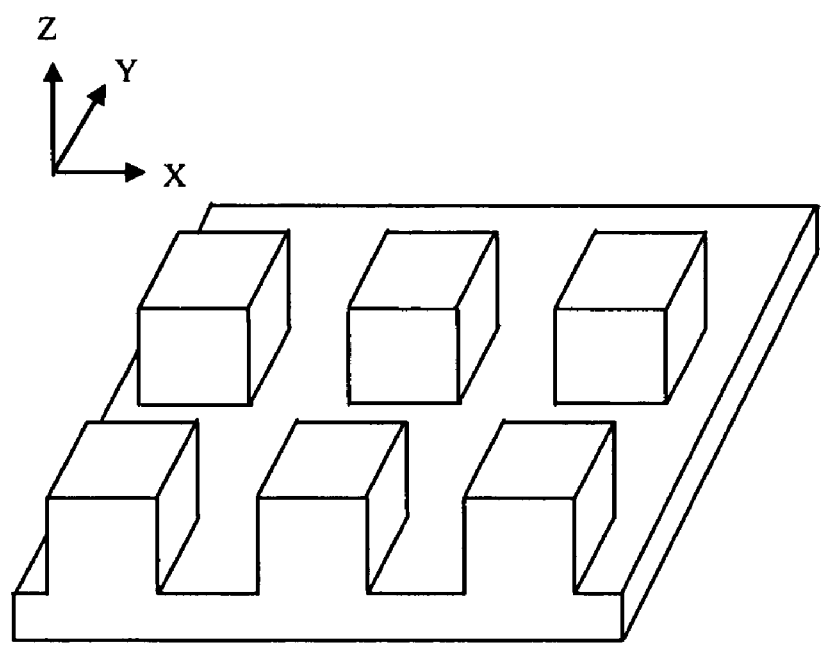
FIG. 1C depicts an exemplary two-dimensional structure

The term "two-dimensional structure" is used herein to refer to a structure having a profile that varies in two-dimensions. For example, FIG. 1C depicts a periodic grating having a profile that varies in two dimensions (i.e., the x-direction and the y-direction). The profile of the periodic grating depicted in FIG. 1C varies in the z-direction as a function of the x-direction or y-direction.

Figure 2A:
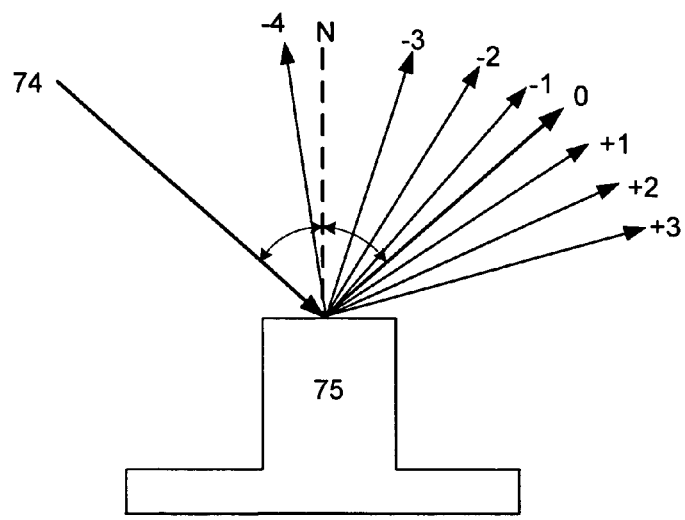
FIG. 2A is an architectural diagram illustrating orders of a diffraction signal off a repeating structure.

FIG. 2A is an architectural diagram illustrating orders of a diffraction signal off a periodic structure. An incident metrology beam or signal 74 is projected at an incident angle on the structure 75 and is diffracted off the structure 75, wherein the diffracted signal comprises the zeroth order, designated as 0 in the illustration, being the diffracted beam with the angle of diffraction from the normal N the same as the incident beam 74. Several higher diffraction orders designated as +1, +2, +3, −1, −2, −3, and −4 are shown. Other higher diffraction orders and other orders known as evanescent orders are not shown in the illustration.

As described earlier, a simulated diffraction signal is generated for use in optical metrology. Efficient generation of a simulated diffraction signal for a given structure profile involves selecting the number of diffraction orders for each wavelength that provide sufficient diffraction information without overly increasing the computational steps to perform diffraction simulations.

Figure 2B:
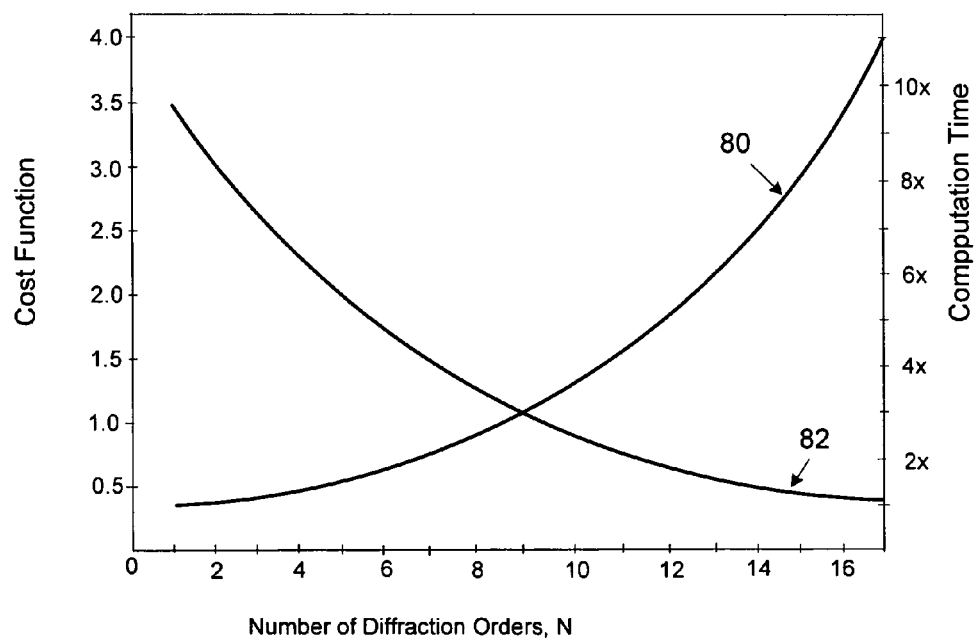
FIG. 2B includes a graph illustrating cost as a function of the number of diffraction orders and a graph illustrating time required to create a library of simulated diffraction signals as a function of the number of diffraction orders considered in the calculations, assuming a given computer system.

FIG. 2B includes a graph illustrating cost as a function of the number of diffraction orders and a graph illustrating time required to create a library of simulated diffraction signals as a function of the number of diffraction orders considered in the calculations, assuming a given computer system. Referring to FIG. 2B, the cost function is represented in the left-hand Y-axis as a function of the number of diffraction orders in the X-axis. One cost function comparison is illustrated by the equations below, where $V_1$ and $V_2$ are two vectors of size n, and the cost function of $V_1$ relative to $V_2$ is:

$$\mathrm{Cost}(V_1, V_2) = \sum_{i=1}^{n} (V_{1i} - V_{2i})^2 \qquad (1.00)$$

In this example, the first vector is a set of signal values simulated for the metrology device used and assuming an infinite number of diffraction orders, referred to as the reference signal, whereas the second vector is another set of simulated signal values at the same points in the signal for the same metrology device but using a given number of diffraction orders less than that used in the reference signal.

Graph line 82 illustrates that the cost function is high when few diffraction orders are included but the cost function quickly decreases with increasing number of diffraction orders until at some number of diffraction order, the diffraction cost function levels off to a convergence value (not shown). Graph line 80 illustrates how the computation time represented in right-hand Y-axis is typically low with few diffraction orders included and rapidly increases in a non-linear fashion as the number of diffraction orders increases. Since the selection of the number of diffraction orders is influenced by a number of variables specific to the structure, metrology device, and integrated circuit (IC) fabrication properties, there is a need for an efficient and repeatable process to select the number of diffraction orders per wavelength for each application.

Figure 2C:
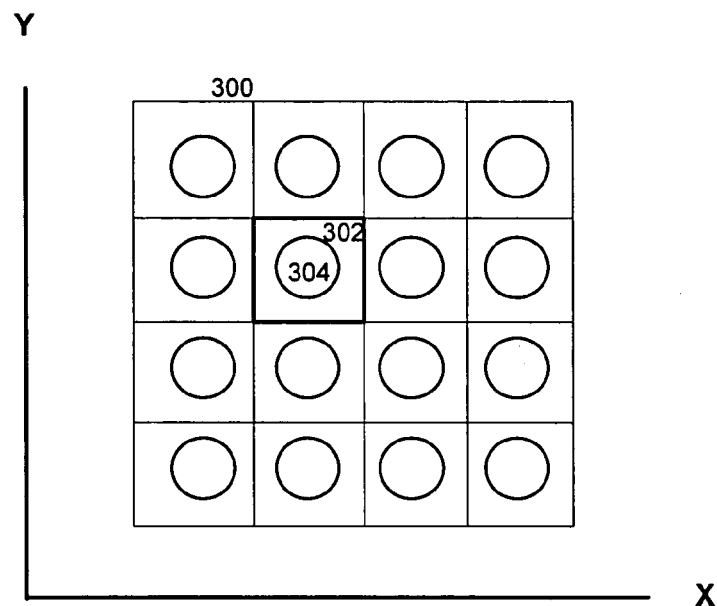
FIG. 2C depicts exemplary orthogonal grid of unit cells of a two-dimensional repeating structure.

Discussion for FIGS. 2C, 2D, and 2E below describe the characterization of two-dimensional repeating structures for optical metrology modeling. FIG. 2C depicts a top-view of exemplary orthogonal grid of unit cells of a two-dimensional repeating structure. A hypothetical grid of lines is superimposed on the top-view of the repeating structure where the lines of the grid are drawn along the direction of periodicity. The hypothetical grid of lines forms areas referred to as unit cells. The unit cells may be arranged in an orthogonal or non-orthogonal configuration. Two-dimensional repeating structures may comprise features such as repeating posts, contact holes, vias, islands, or combinations of two or more shapes within a unit cell. Furthermore, the features may have a variety of shapes and may be concave or convex features or a combination of concave and convex features. Referring to FIG. 2C, the repeating structure 300 comprises unit cells with holes arranged in an orthogonal manner. Unit cell 302 includes all the features and components inside the unit cell 302, primarily comprising a hole 304 substantially in the center of the unit cell 302.

Figure 2D:
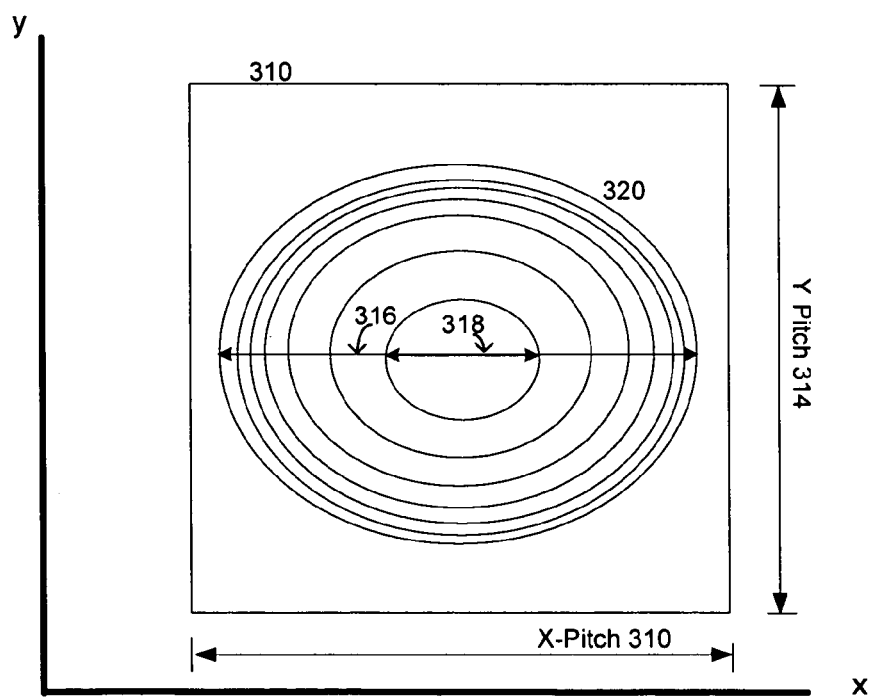
FIG. 2D depicts a top-view of a two-dimensional repeating structure.

FIG. 2D depicts a top-view of a two-dimensional repeating structure. Unit cell 310 includes a concave elliptical hole. FIG. 2D shows a unit cell 310 with a feature 320 that comprises an elliptical hole wherein the dimensions become progressively smaller until the bottom of the hole. Profile parameters used to characterize the structure includes the X-pitch 310 and the Y-pitch 314. In addition, the major axis of the ellipse 316 that represents the top of the feature 320 and the major axis of the ellipse 318 that represents the bottom of the feature 320 may be used to characterize the feature 320. Furthermore, any intermediate major axis between the top and bottom of the feature may also be used as well as any minor axis of the top, intermediate, or bottom ellipse, (not shown).

Figure 2E:
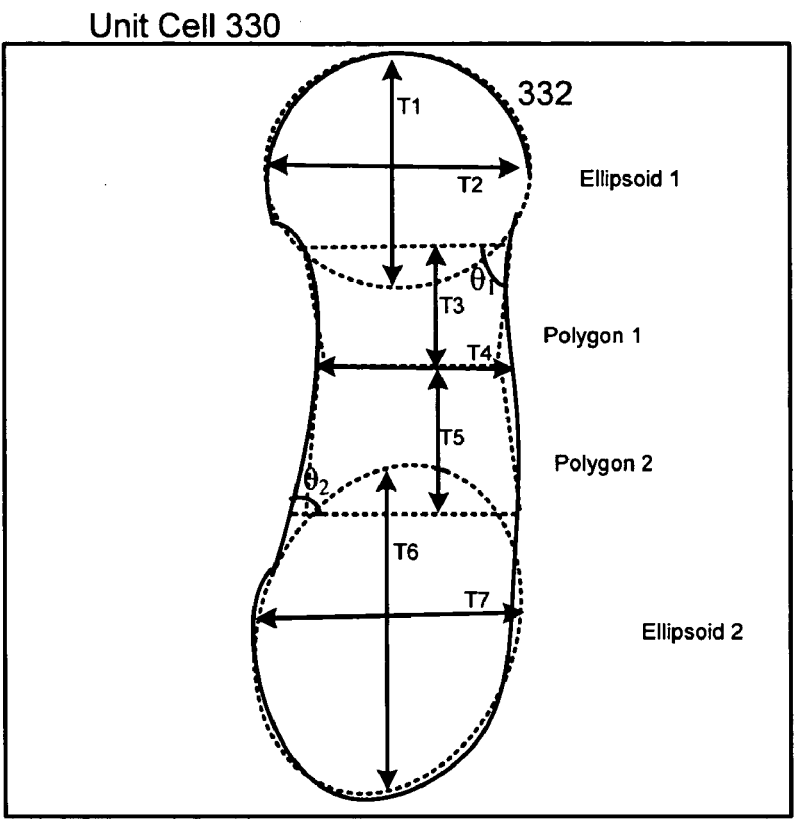
FIG. 2E is an exemplary technique for characterizing the top-view of a two-dimensional repeating structure.

FIG. 2E is an exemplary technique for characterizing the top-view of a two-dimensional repeating structure. A unit cell 330 of a repeating structure is a feature 332, an island with a peanut-shape viewed from the top. One modeling approach includes approximating the feature 332 with a variable number or combinations of ellipses and polygons. Assume further that after analyzing the variability of the top-view shape of the feature 322, it was determined that two ellipses, Ellipsoid 1 and Ellipsoid 2, and two polygons, Polygon 1 and Polygon 2 were found to fully characterize feature 332. In turn, parameters needed to characterize the two ellipses and two polygons comprise nine parameters as follows: T1 and T2 for Ellipsoid 1; T3, T4, and $\theta_1$ for Polygon 1; T4. T5, and $\theta_2$ for Polygon 2; T6 and T7 for Ellipsoid 2. Many other combinations of shapes could be used to characterize the top-view of the feature 332 in unit cell 330. For a detailed description of modeling two-dimensional repeating structures, refer to U.S. patent application Ser. No. 11/061,303, OPTICAL METROLOGY OPTIMIZATION FOR REPETITIVE STRUCTURES, by Vuong, et al., filed on Apr. 27, 2004, and is incorporated herein by reference in its entirety.

Figure 3A:
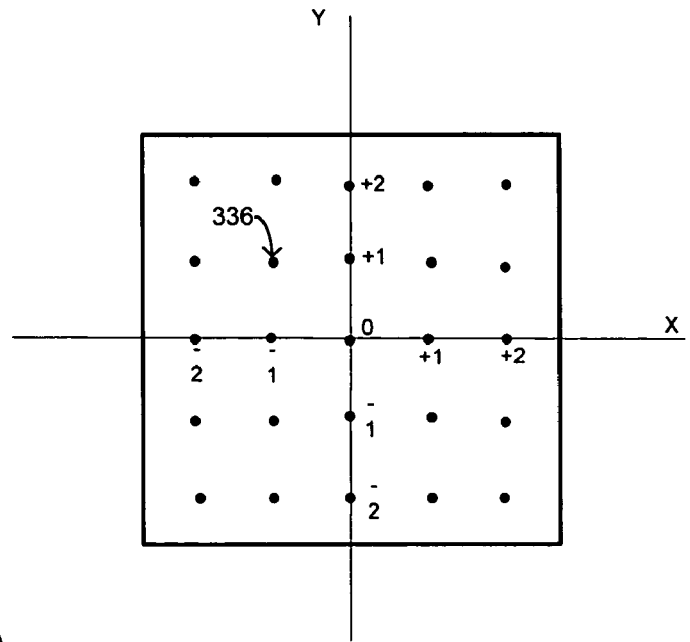
FIG. 3A is a depiction of the array of diffraction orders off a two-dimensional repeating structure.

As mentioned above, FIG. 3A is used to discuss an exemplary depiction of the array of diffraction orders off a two-dimensional repeating structure. Referring to FIG. 3A, the diffraction orders are represented as dots in an X and Y-axes. In this representation, the array of diffraction orders are within a rectangular area with the zeroth order, designated as 0 is at the origin of the X and Y-axes. The +1, +2, and higher positive orders are on the left X-axis with the −1, −2, and higher negative orders are on the left X-axis; the Y-axis having a similar designation wherein the +1, +2, and higher positive orders are on the top Y-axis with the −1, −2, and higher negative orders are on the bottom Y-axis. A diffraction order 336 is designated by an index m and n where m is the X-axis number of diffraction orders and n is the Y-axis number of diffraction orders. For example, the diffraction order at 336 would be designated by the index of (−1, +1). For a detailed description of modeling two-dimensional repeating structures, refer to U.S. patent application Ser. No. 10/274,252, GENERATING SIMULATED DIFFRACTION SIGNALS FOR TWO-DIMENSIONAL STRUCTURES, by Bischoff, et al., filed on Nov. 25, 2002, and is incorporated herein by reference in its entirety.

Figure 3B:
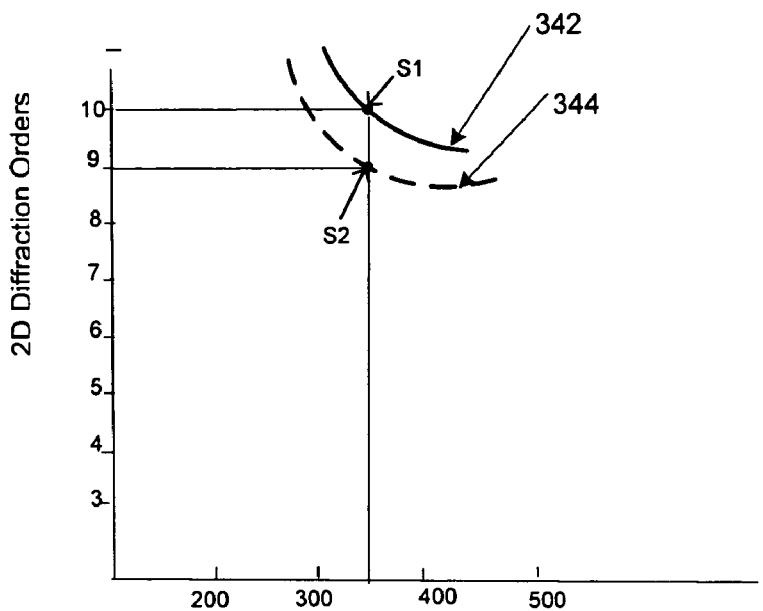
FIG. 3B includes a graph illustrating the number of diffraction orders off a one-dimensional repeating structure as a function of wavelength.
Figure 3C:
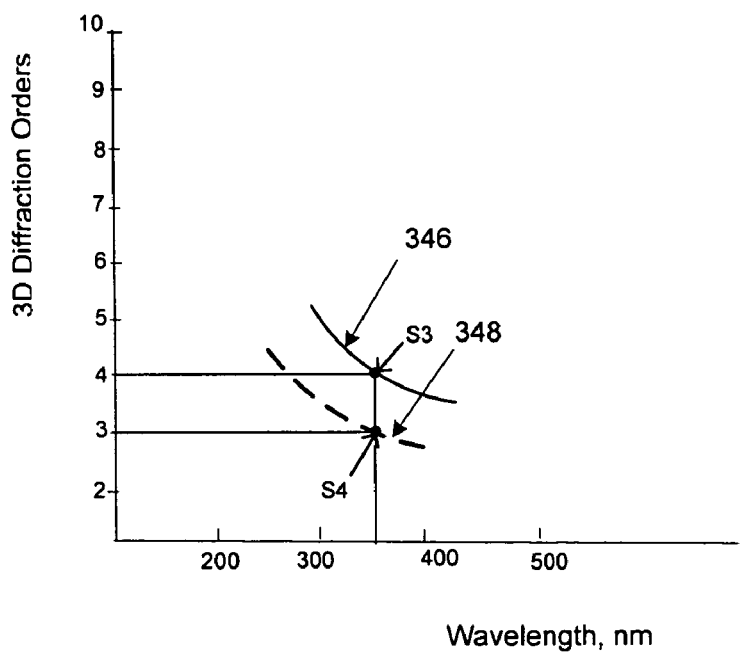
FIG. 3C includes a graph illustrating the number of diffraction orders off a two-dimensional repeating structure as a function of wavelength.

FIG. 3B includes a graph illustrating the number of diffraction orders off a one-dimensional repeating structure as a function of wavelength. FIG. 3C includes a graph illustrating the number of diffraction orders off a two-dimensional repeating structure as a function of wavelength. Referring to FIG. 3B, assume that the diffraction signal off a one-dimensional structure, such as a grating, is being simulated by using a given number of diffraction orders at a given wavelength. Assume that for a wavelength of 350 nanometers (nm), the simulated diffraction signal has a value of S1 when the number of diffraction orders used is 10 orders whereas the simulated diffraction signal has a value of S2 if the number of diffraction orders used is 9 orders. Simulation of the diffraction signal at other wavelengths yields values of the simulated diffraction signal corresponding to the upper curve 342 at 10 diffraction orders and lower curve 344 at 9 diffraction orders. The length of relative time to perform the simulation for a one-dimensional structure is proportional to $(2N+1)^2$, where N is the number of diffraction orders for positive and negative orders. Thus, for a one-dimensional structure, the values of $(2N+1)^2$ is 729 and 1,000 for number of diffraction orders of 9 versus 10.

Referring to FIG. 3C, the length of relative time to perform the simulation for a two-dimensional structure is proportional to $((2N+1)^2)^3$, where N is the number of diffraction orders for positive and negative orders. Simulation of the diffraction signal at 350 nm and other wavelengths yields values of the simulated diffraction signal corresponding to the upper curve 346 at 4 diffraction orders and lower curve 348 at 3 diffraction orders. For a two-dimensional structure, the values of $((2N+1)^2)^3$ is 729 and 4,096 for number of diffraction orders of 3 versus 4. Thus, the increase in relative compute time for two-dimensional structures is rapid. As mentioned above, the length of simulation time is optimized together with other variables including accuracy of the simulated diffraction signal.

Figure 4:
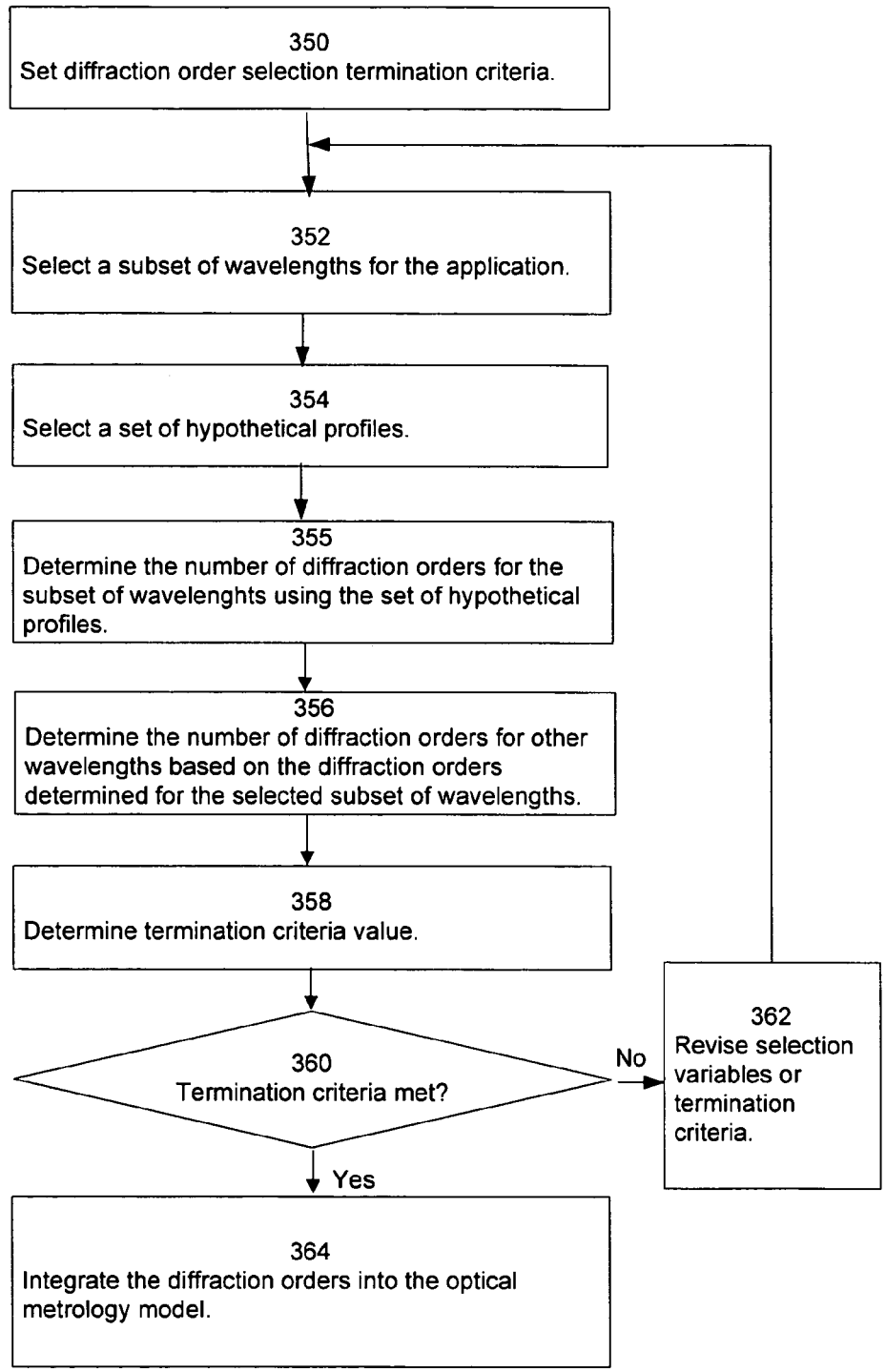
FIG. 4 is a flow chart of an exemplary process of selecting number of diffraction orders for two-dimensional repeating structure.

FIG. 4 is a flow chart of an exemplary process for selecting the number of diffraction orders to use generating a simulated diffraction signal for a two-dimensional repeating structure. In step 350, two or more termination criteria are set. For example, the termination criteria may include speed of simulation of the diffraction signal and accuracy of the simulated diffraction signal. Speed of simulation may be expressed as a relative speed compared to one-dimensional structure signal simulation or an absolute speed such as equal to or less than 30 seconds per simulation. Accuracy may be expressed as a difference between the simulated diffraction signal compared to the simulated diffraction signal if the convergence number of diffraction orders is used. Alternatively, accuracy may be expressed as a percentage of the accuracy of the metrology device. For example, a given reflectometer may be able to measure a CD of a structure to within 3 nm of the measurement of the same CD using a CDSEM. Other embodiments may use accuracy metrics comparing the measurement of the metrology device to a reference metrology device such as a CDSEM or an atomic force microscope (AFM).

Referring to FIG. 4, in step 352, a subset of wavelengths is selected. In one exemplary embodiment, critical wavelengths for the application are selected as the subset of wavelengths. Critical wavelengths are the wavelengths in the range of wavelengths used for the application that register significant changes to the simulated or measured diffraction signal with changes to the profile parameters. For example, assuming the metrology device is a reflectometer, a change in a profile parameter, such as the bottom CD of a structure, may cause a significant change in the diffraction signal. More specifically, the simulated or measured reflectance at a first wavelength may not change noticeably for a unit change of the bottom CD, but the reflectance may have a tenfold change at a second wavelength for the same unit change of the bottom CD. The second wavelength is referred to as a critical wavelength.

Changes to the diffraction signal due to a change in a profile parameter are also referred to as diffraction sensitivity. One of the critical wavelengths is the Wood's anomaly wavelength. The Wood's anomaly wavelength may be determined by using the following equation:

$$\sec^2 \xi (\alpha_m^2 + \beta_n^2 - 2\alpha_m \beta_m \sin \xi) + \gamma_{mn}^{(\alpha)2} = k^{(\alpha)2} \quad (1.05)$$

ξ is the complement of the angle of the direction of the two pitches. α and β are the X and Y components respectively of the wave propagation vector. γ is the Z component of the wave propagation vector. a is the + or − directional value, where α=±1, n, m is the index of the number of diffraction orders. k is the length of the wave propagation vector. sec=1/cos.

With $\lambda_{nm}$32 0, equation (1.05) can be used to solve for k and determine the Wood's anomaly wavelength λ. Alternatively, one can solve for α and β to find φ and ψ where φ is the incident angle of the beam and ψ is the azimuth angle. φ and ψ are used to determine the Wood's anomaly wavelength, y. For a detailed description on determining the Wood's anomaly wavelength using equation (1.05), refer to Lifeng Li "New Formulation of the Fourier modal method for crossed surface-relief gratings", Journal Optical Society of America, Vol. 14, No. 10, October 1997, and is incorporated in its entirety herein by reference. Other critical wavelengths are the starting and ending wavelengths for the range of wavelengths selected for the application. In other embodiments, in addition to the Wood's anomaly wavelength, other specific critical wavelengths may be selected based on experience with the application.

In step 354 of FIG. 4, a set of hypothetical profiles is selected for optimizing the two or more termination criteria. Profile parameters of the hypothetical profiles are typically specified with a low value, a nominal value, and a high value. For example, a bottom CD of a structure may be specified with a low value of 20 nm, a nominal value of 30 nm, and a high value of 40 nm. The set of hypothetical profiles can be selected to utilize one or more profile parameters at the low value, nominal value, high value, or a combination of the low values, nominal values, or high values. Using the example above, profiles specifying the bottom CD at 20 nm, 30 nm, and 40 nm may be selected.

In another embodiment, random sampling is used wherein one or more randomizing algorithm is used. In yet another embodiment, the selection of a hypothetical profile with a specific value of the profile parameter is based on whether the profile parameter is for the patterned or the unpatterned portion of the repetitive structure. In a further variation of this approach, hypothetical profiles selected may include only low and high values or only nominal values of a profile parameter, depending on the total number of profile parameters included in the hypothetical profile. Still another embodiment includes selecting profiles that include variations of the profile parameters that exhibit high diffraction sensitivity. For example, if the bottom width of a feature such as an island exhibits high diffraction sensitivity, then several values within the range of the bottom width of island are utilized as variations in the selected hypothetical profiles.

Still referring to FIG. 4, in step 355, the number of diffraction orders to use for each of the selected subset of wavelengths is determined. The methods of determining the number of diffraction order to use for a wavelength are described in connection with FIGS. 5, 6, and 7 below. In step 356, the number of diffraction orders to use for the wavelengths other than selected subset of wavelengths is determined using the number of diffraction order determined for the selected subset of wavelengths. For example, consider the case where the selected subset of wavelengths included wavelengths at 250, 440, and 700 nm and the corresponding number of diffraction orders determined for these are 5, 8, and 6, respectively. The number of diffraction orders for 440 and 700 nm (i.e., 7 and 8) may be used to interpolate a number of diffraction orders for wavelength 500 nm. In one embodiment, different techniques of interpolation of the number of diffraction orders for two or more wavelengths from the selected subset of wavelengths are used. Interpolation techniques may include linear, polynomial, quadratic, cubic interpolation and the like. In other embodiments, a best fit curve may be determined using all the number of diffraction orders for the subset of wavelength and the number of diffraction orders for the remaining wavelengths are determined from the best fit curve.

In step 358, the termination criteria values are determined. For example, as mentioned above, the termination criteria may include time needed to simulate the diffraction signal and the accuracy of the simulated diffraction compared to the accuracy of the metrology device. As an example of termination criteria, the time required for simulation may be set at 20 seconds or less and that the simulated diffraction signal must be within 3 nm of the measurement capability of the optical metrology device. Other examples of accuracy termination criteria may include the simulated diffraction signal capable of detecting a percentage of the reflectivity capability of a reflectometer or a fraction or percentage of a degree of change in polarization of the diffraction signal. Referring to step 358, the termination criteria are calculated using the number of diffraction orders for each wavelength and the set of profiles selected above.

In step 360, if the termination criteria are met, the selected number of diffraction orders per wavelength is integrated into the optical metrology model. Continued processing of the optical metrology model is discussed in connection with FIGS. 8A, 8B, and 9 below. If the termination criteria are not met, then one or more of the selection criteria for the subset of wavelengths, set of profiles, technique for number of diffraction orders determination, interpolation algorithm used for determining number of diffraction orders for other than the subset of wavelengths, or the termination criteria are altered. Steps 352 to 360 are iterated until the termination criteria are met.

Two types of number of diffraction order selections are discussed, namely, symmetrical and asymmetrical diffraction order selection. Symmetrical selection refers to the process where the positive and negative higher orders are selected in pairs plus the zeroth order. Asymmetrical selection considers each diffraction order separately and thus, the selected orders may include more of either the positive or negative orders.

Figure 5:
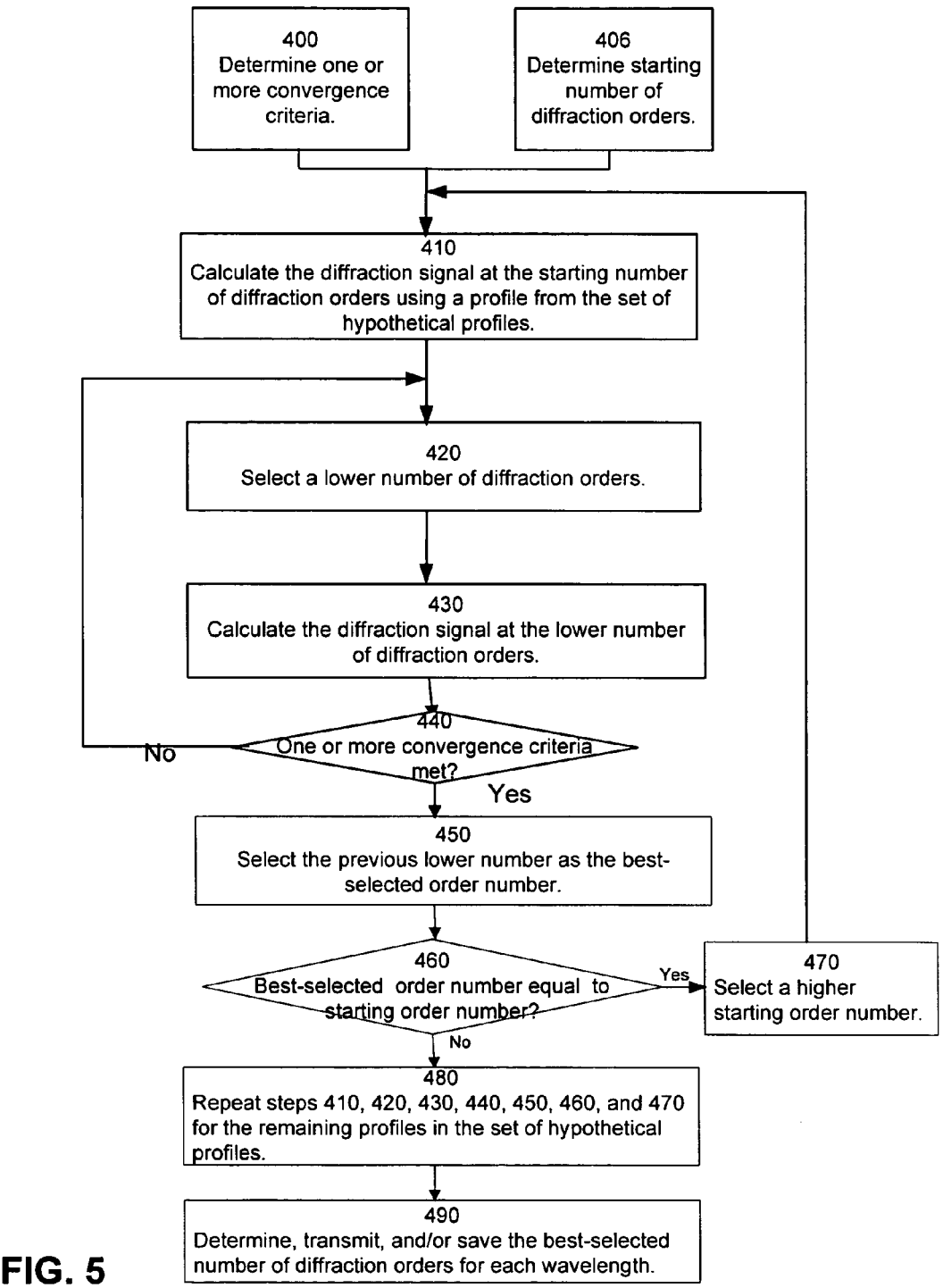
FIG. 5 is a flow chart of an exemplary process using a high starting number of diffraction orders for determining the number of diffraction orders.
Figure 6:
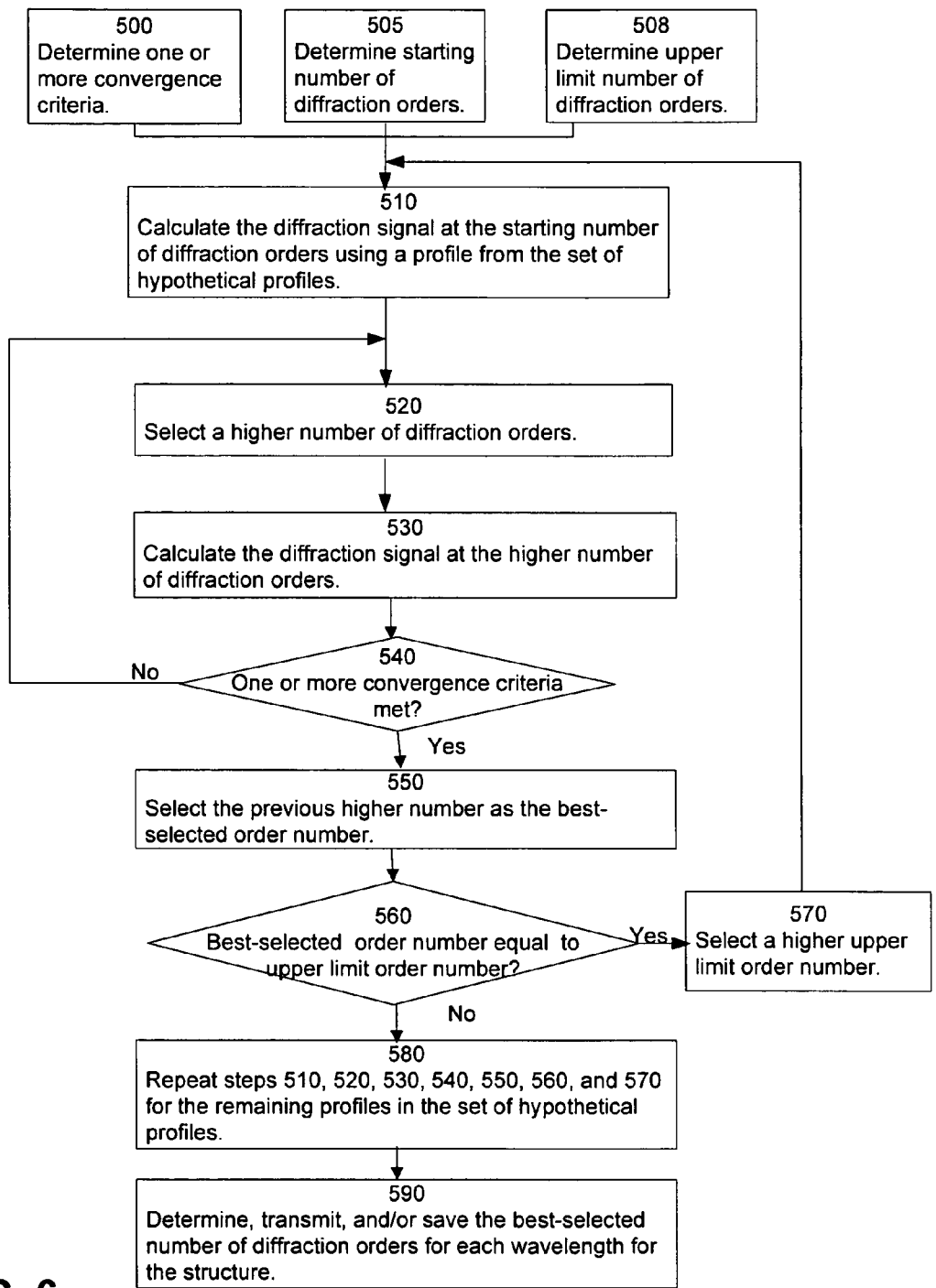
FIG. 6 is a flow chart of an exemplary process using a low starting number of diffraction orders for determining the number of diffraction orders.
Figure 7A:
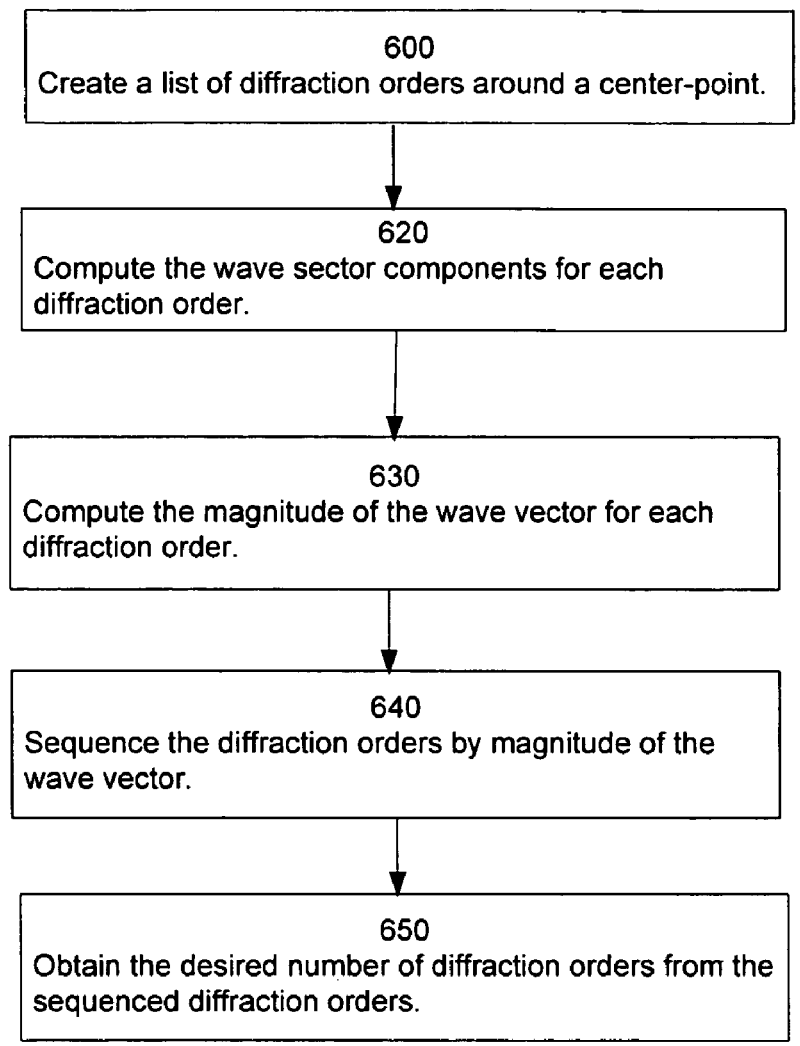
FIG. 7A is a flow chart of an exemplary process for determining the number of diffraction orders to include in asymmetrical order selection.
Figure 7B:
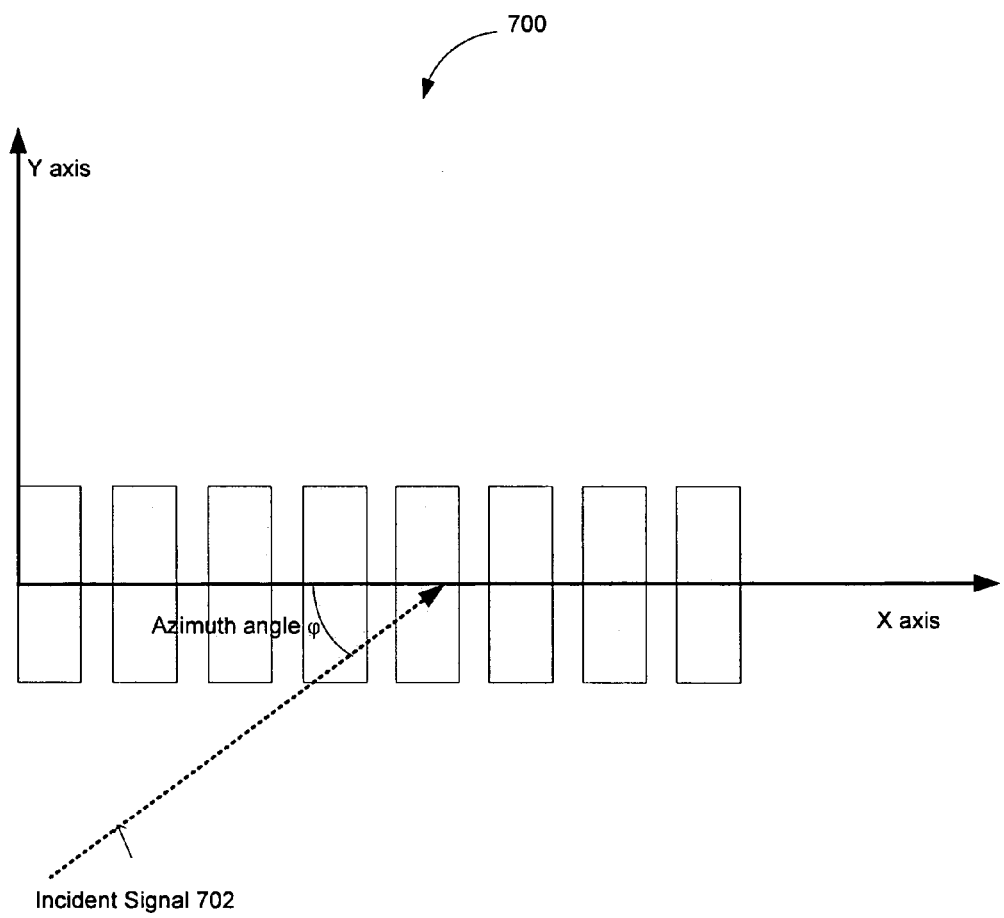
FIG. 7B is a top-view of a repeating structure illustrating the fixed coordinate system, azimuthal angle, and direction of periodicity.

FIG. 5 and FIG. 6 are flow charts of exemplary processes to select the number of diffraction orders for optical metrology calculations using symmetrical diffraction order selection. FIG. 5 is a flow chart of an exemplary process using a high starting number of diffraction orders whereas FIG. 6 is a flow chart of an exemplary process using a low starting number of diffraction orders. FIG. 7A is a flow chart of an exemplary process to select the number of diffraction orders for optical metrology calculations using asymmetrical diffraction order selection. FIG. 7B is a top-view of a repeating structure illustrating the fixed coordinate system, azimuthal angle, and direction of periodicity referenced in asymmetrical diffraction order selection.

Referring to FIG. 5, in step 400, one or more convergence criteria for the number of diffraction orders selection process is determined. A convergence criterion is a yardstick against which the result of the selection process is measured. The convergence criteria may include a cost function value, a Goodness-of-Fit (GOF) value, and/or other curve fitting metrics. A cost function convergence criterion may be set at a specific number, for example, 1.00. Another convergence criterion may be the goodness of fit (GOF) between the simulated diffraction signal values using one set of diffraction orders and another simulated diffraction signal using a different set of diffraction orders. The GOF is a measure of the proximity of two sets of values. For example, when ellipsometric measurements are used, GOF is based on values for tan ψ and cos Δ, where tan ψ and cos Δ are represented by a single vector of 2n dimensions:

$$S=[\tan \psi_1 \tan \psi_2 \ldots \tan \psi_n \cos \Delta_1 \cos \Delta_2 \ldots \cos \Delta_n. \quad (1.10)$$

One commonly used formula for GOF between a simulated diffraction signal $S_m$ compared to another simulated diffraction signal $S_s$ is:

$$GOF = 1 - \frac{\sum_i^n (S_s(i) - S_m(i))^2}{\sum_i^n (S_m(i) - \overline{S}_m)^2}, \quad (2.00)$$

$$\text{where } \overline{S}_m = \frac{\sum_i^n S_m(i)}{n}. \quad (2.10)$$

i represents the i th measurement point for an optical metrology device. n is the total number of measurements for the optical metrology device.

In step 405 of FIG. 5, the starting number of diffraction orders is determined for a specific wavelength. For example, at a wavelength of 300 nm, a starting number of diffraction orders may be set at 31, comprising 15 positive, 15 negative, and the zeroth order for symmetrical order selection. For asymmetrical order selection, the starting number of diffraction orders may be set at 30, 31, or 32 orders. However, the composition of the starting number of diffraction orders for asymmetrical selection is determined in a process depicted in FIG. 7A below, and may include more positive or negative diffraction orders.

In step 410 of FIG. 5, the simulated reference diffraction signal using the starting number of diffraction orders is calculated using a hypothetical profile from the set of hypothetical profiles. For a detail description of the calculations to simulate a diffraction signal, refer to U.S. Pat. No. 6,891,626, titled CACHING OF INTRA-LAYER CALCULATIONS FOR RIGID COUPLE-WAVE ANALYSES, by Niu et al., issued on May 10, 2005, which is incorporated herein by reference in its entirety.

Still referring to FIG. 5, in step 420, a lower number of diffraction orders as compared to the starting number is selected. The lower number may be selected by using any of several processes such as decrementing successively the starting number by 1, 2 or 3 every iteration as an example. Alternatively, the lower number may be determined using binary search techniques or similar methods. In step 430, the new simulated diffraction signal using the lower number of diffraction orders is calculated using the technique applied in step 410.

In step 440, the one or more convergence criteria are tested using the reference and new diffraction signals calculated in steps 410 and 430. For example, if only one convergence criterion is used such as the cost function being greater than 2.00, then the cost function of the simulated diffraction signal using the starting number of diffraction orders versus the simulated diffraction signal using the lower order is calculated and compared to 2.00. In another case, there may be two convergence criteria such as the cost function being greater than 2.00 and the GOF of the same two simulated diffraction signals lower than say 0.95. In step 440, if the one or more convergence criteria are met, then the processing proceeds to step 450, otherwise, steps 420, 430, and 440 are iterated.

In step 450, the previous lower number of diffraction orders is selected as the best-selected number of diffraction orders. For example, if the first lower number of diffraction orders is 29 and the convergence criteria are not met, then steps 420, 430, and 440 are iterated. Suppose further that the second lower number of diffraction orders is 27 and this time the convergence criteria are met, then 29 is the previous lower number of diffraction orders and is selected as the best-selected number of diffraction orders for the wavelength.

In step 460, the best-selected number of diffraction orders is compared with the starting number of diffraction orders and if equal, meaning the starting number of diffraction orders is set too low, processing proceeds to step 470 where a higher starting number of diffraction orders is selected. As an illustration, if after the first iteration with the first lower number of diffraction orders at 29 the convergence criteria are met, then the previous lower number is 31 and is the same as the starting number of 31. In this case, processing proceeds to step 470 where a starting number higher than 31 is selected. The choice of starting numbers of diffraction orders is specific to the application and is affected by fabrication process, type of metrology device, and the like. Based on experience with the particular application, a sequenced set of starting numbers of diffraction orders may be used. Following the example above, the sequenced set of starting numbers of diffraction orders may be 31, 41, or 51 order numbers.

After selection of a higher starting number of diffraction orders is completed, processing proceeds to step 410, where steps 410 through 450 are iterated. If the best-selected number of diffraction orders is not equal to the starting number of diffraction orders, processing proceeds to step 480, where the steps 410, 420, 43, 440, 450, 460, and 470 are repeated for the remaining hypothetical profiles in the set of hypothetical profiles.

In step 490, the best-selected number of diffraction orders for the wavelength from the numbers of diffraction orders determined for all of the hypothetical profiles in the set of hypothetical profiles is determined, transmitted, and/or saved. The best-selected number of diffraction orders from the number of diffraction orders determined for all of the hypothetical profiles in the set of hypothetical profiles may be determined by selecting the highest number of diffraction orders or using statistical or averaging algorithms.

The process illustrated in FIG. 5 is performed for all wavelengths in the selected subset of wavelengths. Moreover, the processing for all the wavelengths in the selected subset of wavelengths is iterated for the TM and TE components of the signal when ellipsometric metrology is used. Identification data related to fabrication process, structure, and optical metrology device may also be transmitted and/or saved in step 490. A fabrication process identifier may be a specific lithography or etch process, a structure identifier may be an identifier of the site where the structure is located or an identifier of the type of IC device, and the optical metrology device may be a specific reflectometer or ellipsometer.

FIG. 6 is a flow chart of an exemplary process of selecting the number of diffraction orders using a low starting number of diffraction orders. This technique may shorten the number of steps needed to determine the best-selected number of diffraction orders. Processing is very similar to the general sequence of steps depicted in FIG. 5 and differences will be noted.

Referring to FIG. 6, in step 500, one or more convergence criteria for the number of diffraction orders selection process is determined. As before, the convergence criteria may include a cost function value, a Goodness-of-Fit (GOF) value, and/or other curve fitting metrics. In step 505 of FIG. 6, the starting number of diffraction orders is determined for a specific wavelength. For example, at a wavelength of 300 nm, a starting number of diffraction orders may be set at 9, comprising 4 positive, 4 negative, and the zeroth order for symmetrical order selection. For asymmetrical order selection, the starting number of diffraction orders may be set at 9, 11, or 13 orders, for example. In step 508, the upper limit number of diffraction orders is determined. In step 510, the simulated diffraction signal using the starting number of diffraction orders is calculated using a hypothetical profile from the set of hypothetical profiles in a manner similar to step 410 of FIG. 5.

Still referring to FIG. 6, in step 520, a higher number of diffraction orders as compared to the starting number are selected. The higher number of diffraction orders may be selected by using any of several processes such as incrementing successively the starting number by 1, 2 or 3 during every iteration, for example. Alternatively, the higher number may be determined using binary search techniques or similar methods. In step 530, the simulated diffraction signal using the higher number of diffraction orders is calculated using the technique applied in step 510.

In step 540, the one or more convergence criteria are tested using the diffraction signals calculated in steps 510 and 530. For example, if only one convergence criterion is used such as the cost function being less than 2.00, then the cost function of the simulated diffraction signal using the starting order versus the simulated diffraction signal using the higher number of diffraction orders is calculated and compared to 2.00. In another case, there may be two convergence criteria such as the cost function being less than 2.00 and the GOF of the same two simulated diffraction signals higher than say 0.95. In step 540, if the one or more convergence criteria are met, then the processing proceeds to step 550, otherwise, steps 520, 530, and 540 are iterated.

In step 550, the previous higher number of diffraction orders is selected as the best-selected number of diffraction orders. For example, if the first higher number of diffraction orders is 9 and the convergence criteria are not met, then steps 520, 530, and 540 are iterated. Suppose further that the second higher number of diffraction orders is 11 and this time the convergence criteria are met, then 9 is the previous higher number of diffraction orders and is selected as the best-selected number of orders for the wavelength.

In step 560, the best-selected number of diffraction orders is compared with the starting number of diffraction orders and if equal, meaning the starting number of diffraction orders is set too high, processing proceeds to step 570 where a lower starting number of diffraction orders is selected. In the example above, if after the first iteration with the first higher number of diffraction orders at 11, the convergence criteria are met, then the previous higher number is 9, i.e., the same as the starting number. In this case, in step 570, a starting number lower than 9 is selected. The choice of starting numbers of diffraction orders is specific to the application and is affected by fabrication process, type of metrology device, and the like. Based on experience with the particular application, a sequenced set of starting numbers of orders may be used. Following the example above, the sequenced set of starting numbers may be 9, 21, or 41 diffraction orders.

After selection of a higher starting number of diffraction orders is completed, processing proceeds to step 510 where steps 510 through 550 are iterated. If the best-selected number of diffraction orders is not equal to the starting number of orders, processing proceeds to step 580 where steps 510, 520, 530, 540, 550, 560, and 570 are repeated for the remaining hypothetical profiles in the set of hypothetical profiles.

In step 590, the best-selected number of diffraction orders for the wavelength from the numbers of diffraction orders determined for all of the hypothetical profiles in the set of hypothetical profiles is determined, transmitted, and/or saved. The best-selected number of diffraction orders from the number of diffraction orders determined for all of the hypothetical profiles in the set of hypothetical profiles may be determined by selecting the highest number of diffraction orders or using statistical or averaging algorithms.

Similar to the first process described, the selection of number of diffraction orders is performed for each wavelength included in the simulation of the diffraction signal. Moreover, the processing for all the wavelengths considered is iterated for the TM and TE components of the signal when ellipsometric metrology is used.

FIG. 7A is an exemplary flow chart for determining the number of diffraction orders to include in asymmetrical order selection. As stated before, asymmetrical order selection may include different number of positive and negative orders plus the zeroth order. An exemplary method for selecting the number of diffraction orders should be included is the center-point of the diffraction orders technique. In step 600, a list of specific diffraction orders around a center-point of diffraction orders is created based on the number of diffraction orders N desired. The center-point is located using the grating equation:

$$CP = \text{int}\left[\frac{n_0 P}{\lambda_0} \text{Sin}\theta \cdot \text{Cos}\varphi\right]. \quad (3.2.0)$$

CP is the center-point diffraction order. $n_0$ is the refractive index of air. P is the period of the periodic structure. $\lambda_0$ is the wavelength in free space. $\theta$ is the angle of incidence. $\varphi$ is the azimuthal angle. Int(.) rounds the argument to an integer.

The given number of diffraction orders N around the center-point is chosen for the application, typically determined from data specific to the application, the metrology device used, and the specific structure in the wafer or workpiece. In one embodiment, N is a function of the starting number of diffraction orders referred to in the descriptions for FIGS. 5 and 6. For example, if N is 5 and the center-point diffraction order CP according to Equation (3.2.0) is −1, then the list of diffraction orders around −1 is: [−6, −5, −4, −3, −2, −1, 0, 1, 2, 3, 4].

In step 620, the wave sector components for each diffraction order in the list is computed using the following equations for the x and y components of a fixed coordinate system for a periodic structure, discussed below in relation to FIG. 7B:

$$k_x = n_0 k_0 \text{Sin}\theta \cdot \text{Cos}\varphi - \frac{2\pi}{P_x} \cdot \text{Order} \quad (3.2.2)$$

$$k_y = n_0 k_0 \text{Sin}\theta \cdot \text{Sin}\varphi - \frac{2\pi}{P_y} \cdot \text{Order} \quad (3.2.4)$$

$$k_0 = \frac{2\pi}{\lambda_0}. \quad (3.2.5)$$

Order is the diffraction order expressed as an integer 1, 2, 3 . . . n. $k_x$ is the wave vector component in the x dimension. $k_y$ is the wave vector component in the y dimension. $P_x$ is the period of the periodic structure in the x dimension. $P_y$ is the period of the periodic structure in the y dimension.

FIG. 7B is a top-view of a repeating structure illustrating the fixed coordinate system, azimuthal angle, and direction of periodicity. Looking at the top of a repeating structure 700, the Y-axis is parallel to the direction of the lines of the repeating structure and the X-axis is along the direction of periodicity of the structure 700. The incident signal 702 has an azimuthal angle of φ relative the X-axis. In the previous example, the $k_x$ and $k_y$ of the list of orders [−6 −5, −4, −3, −2, −1, 0, 1, 2, 3, 4] would be calculated. With reference to FIG. 7A, in step 630, the magnitude of the wave vector k for each diffraction order is computed using the equation:

$$|k|_{Order} = \sqrt{k_x^2 + k_y^2}. \quad (3.2.6)$$

For a detail description and derivation of the equations (3.2.0) to (3.2.6), refer to U.S. Pat. No. 6,891,626, entitled CACHING OF INTRA-LAYER CALCULATIONS FOR RIGID RIGOROUS COUPLE-WAVE ANALYSES, by Niu et al., issued on May 10, 2005, which is incorporated herein by reference in its entirety.

Still referring to FIG. 7A, in step 640, the diffraction orders are sequenced based on the magnitude of the wave vector k. In step 650, the desired number of diffraction orders from the sequenced diffraction orders using the center-point is obtained. Using the list in the previous example, with the center-point order being −1 and the request for sequenced diffraction orders is 4, then [−6−5, −4, −3, −2, −1, 0, 1, 2, 3, 4] would be obtained In one embodiment, the list is of diffraction orders around the center-point is large enough such that steps 600, 620, 630, and 640 are performed once per wavelength of the diffraction wave component, i.e., TM or TE, for the entire number of diffraction orders selection process. For this embodiment, only step 650, where the desired number of diffraction orders from the sequenced diffraction orders using the center-point, is obtained.

In another embodiment, the diffraction orders are sequenced by calculating the diffraction efficiency for each order. For a detailed description of the diffraction efficiency equations, refer to X. Niu 1999 thesis at UC Berkeley, "An Integrated System of Optical Metrology for Deep Sub-Micron Lithography," pages 69-86, which is incorporated herein by reference in its entirety.

Figure 8A:
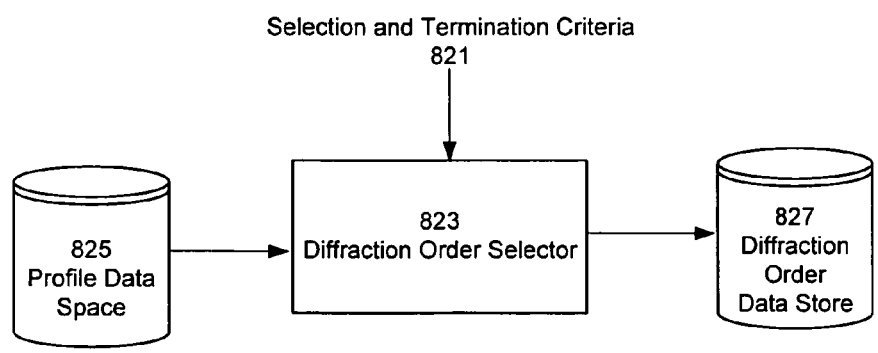
FIG. 8A is an architectural diagram of a diffraction order selector in an exemplary embodiment.

FIG. 8A is an architectural diagram of a number of diffraction orders selector system in an exemplary embodiment. Using the input selection criteria 821, a number of diffraction orders selector 823 selects a subset of wavelengths for the application. The number of diffraction orders selector 823 accesses a profile data space 825 containing a set of structure profiles. The number of diffraction orders selector 823 selects a set of profiles from the profile data space 825 based on the input selection criteria 821 and determines the number of diffraction orders to use for the subset of wavelengths. The number of diffraction orders selector 823 then uses the determined number of diffraction orders for the subset wavelength to determine the number of diffraction orders to use for the rest of the wavelengths. Using the input termination criteria 821, the number of diffraction orders selector 823 calculates the values of the termination criteria against the input termination criteria 821 and iterates the processing until the termination criteria are met. The selected number of diffraction orders per wavelength and identifying information of the fabrication process, structure, and optical metrology device are stored in the diffraction order data store 827.

Figure 8B:
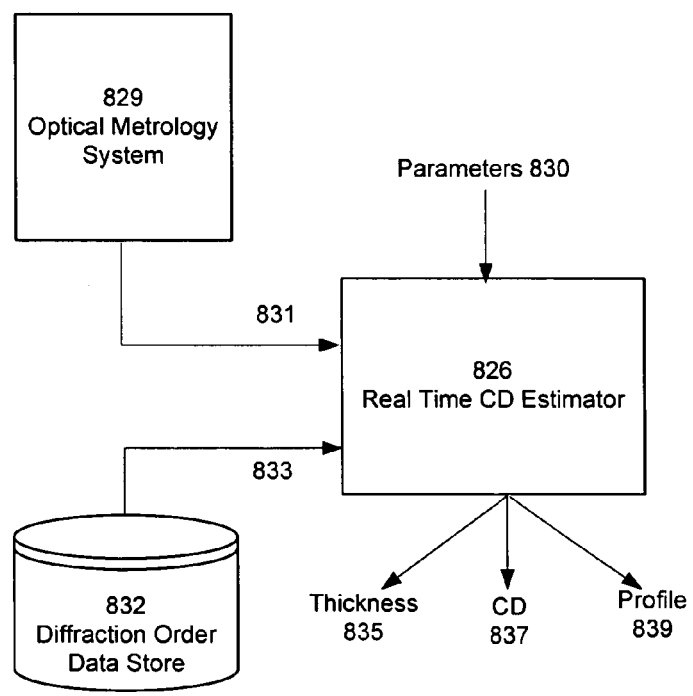
FIG. 8B is an architectural diagram illustrating an exemplary embodiment in a real-time CD estimator.

FIG. 8B is an architectural diagram illustrating an exemplary embodiment in a real-time CD estimator. A real-time CD estimator 826 utilizing measured optical metrology signals 831 from an optical metrology system 829. The optical metrology system 829 may be similar to the optical metrology system described in FIG. 1A, with a specific optical metrology device, such as an ellipsometer. The real-time CD estimator 826 accesses and transmits the diffraction order data store instances 833 from the diffraction order data store 832 using identification data from the input parameters 830 and computes the underlying film thickness 835 of the structure, CD 837 such as top width or bottom width of the structure, and the structure profile 839. For a detailed description of the process of determining real-time underlying film thickness, CD, and profile, refer to co-pending U.S. patent application Ser. No. 10/206,491, titled MODEL AND PARAMETER SELECTION FOR OPTICAL METROLOGY, by Vuong et al., filed on Jul. 25, 2002, which is incorporated herein by reference in its entirety.

Figure 9:
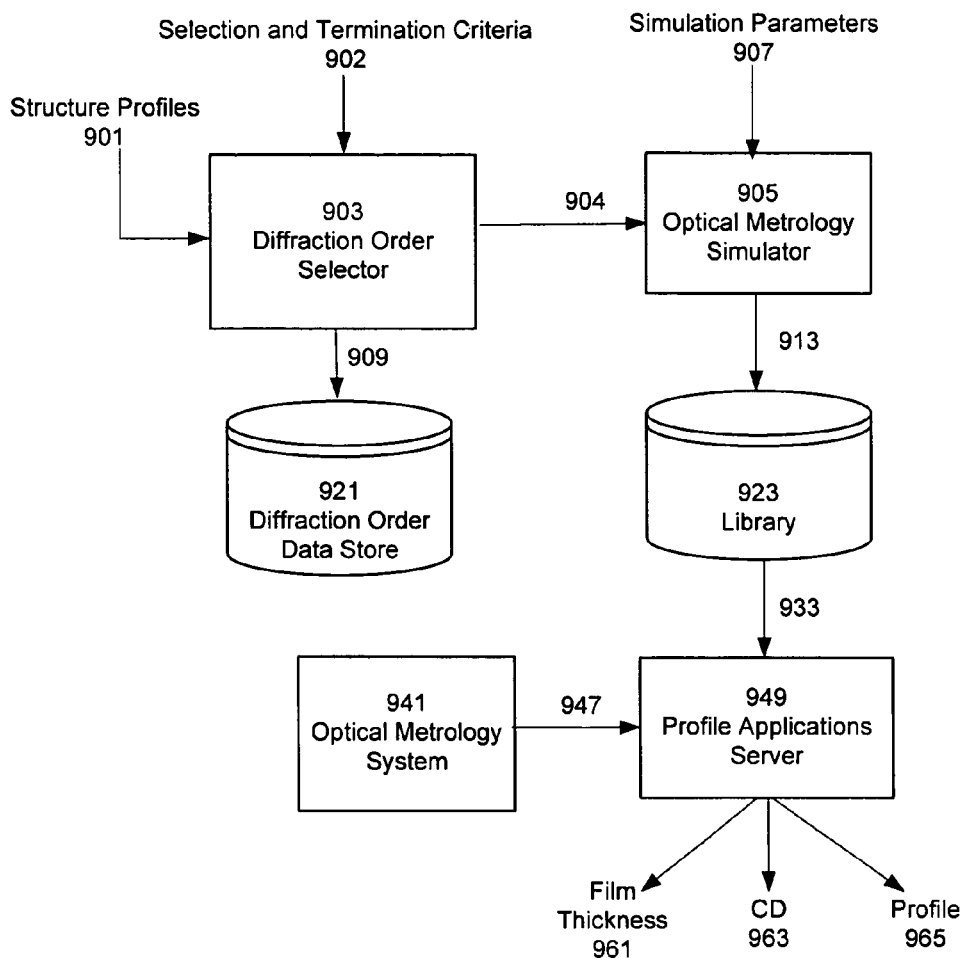
FIG. 9 is an architectural diagram of an exemplary embodiment for creating and using a library of simulated diffraction signals and profiles utilizing selected number of diffraction orders.

FIG. 9 is an architectural diagram of an exemplary embodiment for creating and using a library of simulated diffraction signals and profiles utilizing selected number of diffraction orders, the library in turn being used to determine the underlying film thickness, CD, and profile corresponding to the measured metrology diffraction signals. The number of diffraction orders selector 903 uses input selection and termination criteria 902 and input structure profiles 901 to select the number of diffraction orders first for the subset of wavelengths and determines the number of diffraction orders for the other wavelengths used. From the number of diffraction orders selector 903, the selected number of diffraction orders per wavelength and identification of the fabrication process, site, and metrology device 909 are stored in the diffraction order data store 921. Similar data 904 are also transmitted from the number of diffraction orders selector 903 to the optical metrology simulator 905, which uses simulation parameters 907 to create pairs of profiles and corresponding simulated diffraction signals 913 to build a library 923.

Still referring to FIG. 9, an optical metrology system 941 similar to the system described in FIG. 1A transmits measured diffraction signals 947 to the profile applications server 949. Utilizing the library 923, the profile applications server 949 determines the best match diffraction signal in the library 923, accesses the associated profile data 933, and determines the underlying film thickness 961, CD 963, and profile 965 corresponding to the input measured diffraction signal 947. For a detailed description of the process of determining underlying film thickness, CD, and profile using a library, refer to co-pending U.S. patent application Ser. No. 10/206, 491, titled MODEL AND PARAMETER SELECTION FOR OPTICAL METROLOGY, by Vuong et al., filed on Jul. 25, 2002, which is incorporated herein by reference in its entirety.

Other embodiments include selection of the number of diffraction orders where the range of wavelengths, 200 to 800 nm, is segmented into partitions. Each partition of wavelengths is treated as one set and number of diffraction orders selection is done for the set instead of every wavelength. Reduction of the number of diffraction orders used in optical metrology measurement, processing, and/or simulation can provide several advantages. For example, by selecting the number of diffraction orders per wavelength on a small sample of profiles, the selected number of diffraction orders may be used in a large set of profiles typically created for a production library. Due to the number of calculation steps eliminated, reduction of the number of diffraction orders results in an exponential reduction in time for creating a library for as long as the accuracy requirements are met.

In particular, it is contemplated that functional implementation of the present invention described herein may be implemented equivalently in hardware, software, firmware, and/or other available functional components or building blocks. Other variations and embodiments are possible in light of above teachings, and it is thus intended that the scope of invention not be limited by this Detailed Description, but rather by the following claims.

We claim:

1. A method of selecting the number of diffraction orders to use in generating simulated diffraction signals for a two-dimensional structure in optical metrology, the method comprising:
   a) generating a first simulated diffraction signal using a first number of diffraction orders and a hypothetical profile of the two-dimensional structure;
   b) generating a second simulated diffraction signal using a second number of diffraction orders using the same hypothetical profile used in a) to generate the first simulated diffraction signal, wherein the first and second number of diffraction orders are different;
   c) comparing the first and second simulated diffraction signals; and
   d) determining whether to select the first or second number of diffraction orders based on the comparison of the first and second simulated diffraction signals in c).

2. The method of claim 1, wherein the second number is lower than the first number, and further comprising:
   iterating a) to d) using subsequently lower numbers of diffraction orders for the second number.

3. The method of claim 1, wherein the second number if higher than the first number, and further comprising:
   iterating a) to d) using subsequently higher numbers of diffraction orders for the second number.

4. The method of claim 1, further comprising:
   iterating a) to d) using randomly selected numbers of diffraction orders for the second number.

5. The method of claim 1, wherein the hypothetical profile used in a) and b) is selected from a set of hypothetical profiles, and further comprising:
   iterating a) to d) for each of the hypothetical profiles in the set of hypothetical profiles to select a number of diffraction orders for each hypothetical profile in the set of hypothetical profiles.

6. The method of claim 5, further comprising:
   determining a best-selected number of diffraction orders from the numbers of diffraction orders selected for the hypothetical profiles in the set of hypothetical profiles by selecting the highest number of diffraction orders or using statistical or averaging algorithm.

7. The method of claim 5, wherein the set of hypothetical profiles is selected by:
   selecting one or more hypothetical profiles that include at least one profile parameter with a value corresponding to a low end value of a profile parameter; and/or
   selecting one or more hypothetical profiles that include at least one profile parameter with a value corresponding to a high end value of the profile parameter, and/or
   selecting one or more hypothetical profiles that includes at least a first profile parameter with a value corresponding to a low end value of the first profile parameter and selecting one or more hypothetical profiles that includes at least a second profile parameter with a value corresponding to a high end value of the second profile parameter, and/or
   selecting one or more hypothetical profiles that include at least one profile parameter with a value corresponding to a nominal value of the profile parameter.

8. The method of claim 5, wherein the set of hypothetical profiles is selected by:
   selecting hypothetical profiles that include variations of profile parameters with high diffraction signal sensitivity.

9. The method of claim 1, wherein the diffraction signals include a set of wavelengths, and further comprising:
   selecting a subset of wavelengths from the set of wavelengths; and
   iterating a) to d) to select a number of diffraction orders for each wavelengths in the subset of wavelengths.

10. The method of claim 9, further comprising:
    determining a number of diffraction orders for each remaining wavelength in the set of wavelengths using the numbers of wavelengths determined for the subset of wavelengths.

11. A method of selecting the number of diffraction orders to use for each of a set of wavelengths of a diffraction signal for optical metrology of a two-dimensional structure, wherein the two-dimensional structure has a profile modeled by a hypothetical profile, the hypothetical profile defined by profile parameters, the method comprising:
    a) selecting a subset of one or more wavelengths from the set of wavelengths of the diffraction signal;
    b) obtaining a selected set of hypothetical profiles;
    c) determining the number of diffraction orders to use for each of the selected subset of one or more wavelengths using the selected set of hypothetical profiles and a diffraction order determination algorithm; and
    d) determining the number of diffraction orders to use for the remaining wavelengths in the set of wavelengths using the number of diffraction order determined for the subset of one or more wavelengths.

12. The method of claim 11, further comprising:
    before a), setting two or more termination criteria;
    after d), calculating the two or more termination criteria; and
    if the two or more termination criteria are not met, iterating a) to d) after altering at least one of the wavelengths selected to be in the subset of one or more wavelengths, profile selection, diffraction order determination algorithm, and/or at least one of the two or more termination criteria.

13. The method of claim 12, wherein the two or more termination criteria comprises simulation speed and diffraction signal measurement accuracy.

14. The method of claim 13, wherein the diffraction signal measurement accuracy is a percentage of the accuracy of an optical metrology device used to measure the diffraction signal.

15. The method of claim 12, wherein after altering at least one of the wavelengths selected to be in the subset of one or more wavelengths, profile selection, diffraction order determination algorithm, and/or at least one of the two or more termination criteria comprises:
    altering the critical wavelength selection to change the number of critical wavelengths selected; and/or
    altering profile selection to change the distribution of profiles selected and/or;
    altering the two or more termination criteria in order to adjust time needed for simulation of the diffraction signal; and/or
    altering the diffraction order determination algorithm.

16. The method of claim 11, wherein a) further comprises:
selecting a calculated Wood's anomaly wavelength.

17. The method of claim 16, further comprising:
selecting one or more wavelengths from a range of wavelengths used for optical metrology for the structure other than the Wood's anomaly wavelength.

18. The method of claim 17, further comprising:
selecting one or more wavelengths at the low end of the range and one or more wavelengths at the high end of the range from the range of wavelengths used for optical metrology for the structure.

19. The method of claim 11, wherein b) comprises:
using a mathematical algorithm to select the set of hypothetical profiles.

20. The method of claim 19, wherein the mathematical algorithm is a randomizer.

21. The method of claim 11, wherein b) comprises:
selecting one or more hypothetical profiles that include at least one profile parameter with a value corresponding to a low end value of a profile parameter; and/or
selecting one or more hypothetical profiles that include at least one profile parameter with a value corresponding to a high end value of the profile parameter, and/or
selecting one or more hypothetical profiles that includes at least a first profile parameter with a value corresponding to a low end value of the first profile parameter and selecting one or more hypothetical profiles that includes at least a second profile parameter with a value corresponding to a high end value of the second profile parameter, and/or
selecting one or more hypothetical profiles that include at least one profile parameter with a value corresponding to a nominal value of the profile parameter.

22. The method of claim 11, wherein b) comprises:
selecting profiles that include variations of profile parameters with high diffraction sensitivity.

23. The method of claim 11, wherein c) comprises:
d1) determining one or more convergence criteria;
d2) calculating a reference simulated diffracted signal using a starting number of diffraction orders and one of the hypothetical profiles in the selected set of hypothetical profiles;
d3) determining a revised number of diffraction orders using the starting number of diffraction orders;
d4) calculating a new simulated diffraction signal using the revised number of diffraction orders and the hypothetical profile used to calculate the reference simulated diffraction signal in d2);
d5) determining if the one or more convergence criteria are met using the reference simulated diffracted signal and the new simulated diffraction signal; and
d6) iterating the steps (d1), (d2), (d3), (d4), and (d5) until the one or more convergence criteria are met.

24. The method of claim 11, further comprising:
selecting the highest number of diffraction orders for each of the selected subset of wavelengths determined using the selected set of hypothetical profiles.

25. The method of claim 11, wherein d) comprises:
calculating a number of diffraction orders for each of the remaining wavelengths in the set of wavelengths based on numbers of diffraction orders determined for two or more of the wavelengths in the subset using an interpolation algorithm.

26. The method of claim 25, wherein the interpolation algorithm includes linear, polynomial, quadratic, or cubic interpolation.

27. A method of optimizing an optical metrology system for a two-dimensional structure, the method comprising:
a) optimizing the number of diffraction orders for each wavelength used in simulating the diffraction signal using two or more termination criteria;
b) developing an optical metrology model of a two-dimensional structure;
c) optimizing the optical metrology model of the two-dimensional structure using the optimized number of diffraction orders for each wavelength, the optical metrology model having profile parameters;
d) obtaining a measured diffraction signal off the two-dimensional structure using a metrology device;
e) determining one or more profile parameters of the two-dimensional structure using the measured diffraction signal and the optimized optical metrology model.

28. The method of claim 27, wherein the two or more termination criteria comprises speed of simulation of the diffraction signal and/or accuracy of the simulated diffraction signal.

29. The method of claim 28, wherein the accuracy of the simulated diffraction signal is expressed as a function of the accuracy of diffraction measurement of the metrology device.

30. The method of claim 27, wherein determining one or more profile parameters of the two-dimensional structure is performed in real time.

31. The method of claim 27, wherein determining one or more profile parameters of the two-dimensional structure utilizes a library comprising pairs of simulated diffraction signals and corresponding profile parameters.

32. The method of claim 31, wherein the library and the optical metrology system are integrated with a semiconductor fabrication unit.

33. An optical metrology system for a two-dimensional structure, the system comprising:
a number of diffraction orders optimizer configured to optimize a number of diffraction orders for each wavelength used in simulation of a diffraction signal off a two-dimensional structure;
an optical metrology device for measuring diffraction signals off the two-dimensional structure; and
an optical metrology model optimizer coupled to the number of diffraction orders optimizer and the optical metrology device, the optical metrology model optimizer configured to:
develop an optical metrology model of the two-dimensional structure, the optical metrology model having profile parameters;
optimize profile parameters of the optical metrology model of the two-dimensional structure;
determine one or more profile parameters of the two-dimensional structure using a measured diffraction signal off the two-dimensional structure; and
calculate simulated diffraction signals using the optimized metrology model of the two-dimensional structure.

34. The system of claim 33, wherein the number of diffraction orders optimizer utilizes two or more termination criteria comprising speed of simulation and/or accuracy of simulated diffraction signal.

35. The system of claim 33, wherein the optical metrology device is a scatterometer.

36. The system of claim 35, wherein the scatterometer is a reflectometer or ellipsometer.

37. The system of claim 33, wherein the optical metrology model optimizer is further configured to create a library of pairs of a simulated diffraction signal and corresponding set of profile parameters.

38. The system of claim 37, further comprising:
a profile applications server configured to determine one or more profile parameters from a measured diffraction signal using the library of pairs of simulated diffraction signal and corresponding set of profile parameters.

39. A computer-readable storage medium containing computer executable instructions to select the number of diffraction orders to use in generating simulated diffraction signals for a two-dimensional structure in optical metrology, comprising instructions for:
 a) generating a first simulated diffraction signal using a first number of diffraction orders and a hypothetical profile of the two-dimensional structure;
 b) generating a second simulated diffraction signal using a second number of diffraction orders using the same hypothetical profile used in a) to generate the first simulated diffraction signal, wherein the first and second number of diffraction orders are different;
 c) comparing the first and second simulated diffraction signals; and
 d) determining whether to select the first or second number of diffraction orders based on the comparison of the first and second simulated diffraction signals in c).

40. A computer-readable storage medium containing computer executable instructions to select the number of diffraction orders to use for each of a set of wavelengths of a diffraction signal for optical metrology of a two-dimensional structure, wherein the two-dimensional structure has a profile modeled by a hypothetical profile, the hypothetical profile defined by profile parameters, comprising instructions for:
 a) selecting a subset of one or more wavelengths from the set of wavelengths of the diffraction signal;
 b) obtaining a selected set of hypothetical profiles;
 c) determining the number of diffraction orders to use for each of the selected subset of one or more wavelengths using the selected set of hypothetical profiles and a diffraction order determination algorithm; and
 d) determining the number of diffraction orders to use for the remaining wavelengths in the set of wavelengths using the number of diffraction order determined for the subset of one or more wavelengths.

41. A computer-readable storage medium containing computer executable instructions to optimize an optical metrology system for a two-dimensional structure, comprising instructions for:
 a) optimizing the number of diffraction orders for each wavelength used in simulating the diffraction signal using two or more termination criteria;
 b) developing an optical metrology model of a two-dimensional structure;
 c) optimizing the optical metrology model of the two-dimensional structure using the optimized number of diffraction orders for each wavelength, the optical metrology model having profile parameters;
 d) obtaining a measured diffraction signal off the two-dimensional structure using a metrology device;
 e) determining one or more profile parameters of the two-dimensional structure using the measured diffraction signal and the optimized optical metrology model.

\* \* \* \* \*